(12) United States Patent
Garrick

(10) Patent No.: US 6,968,628 B1
(45) Date of Patent: Nov. 29, 2005

(54) DEER AGING TOOL

(76) Inventor: Russell Scott Garrick, 7319 Rockhurst Dr., Dallas, TX (US) 75214

( * ) Notice: Subject to any disclaimer, the term of this patent is extended or adjusted under 35 U.S.C. 154(b) by 0 days.

(21) Appl. No.: 10/916,805

(22) Filed: Aug. 12, 2004

Related U.S. Application Data

(60) Provisional application No. 60/494,861, filed on Aug. 13, 2003.

(51) Int. Cl.[7] .............................. G01B 1/00; G09B 23/36
(52) U.S. Cl. .............................. 33/511; 33/562; 434/276
(58) Field of Search .................... 33/511–514, 562; 433/1, 26, 229; 434/276, 295; 600/587; D10/64

(56) References Cited

U.S. PATENT DOCUMENTS

| | | | | |
|---|---|---|---|---|
| 1,458,782 A | * | 6/1923 | Shapiro | 433/26 |
| 1,667,205 A | | 4/1928 | Ingwersen | |
| 2,306,464 A | | 12/1942 | Nowotny | 434/263 |
| 2,674,802 A | | 4/1954 | Williams | 434/263 |
| 2,874,487 A | | 2/1959 | Bloom et al. | 134/263 |
| D224,440 S | | 7/1972 | Daughtry | D52/6 |
| 4,517,747 A | * | 5/1985 | Morin | 33/512 |
| 4,797,096 A | | 1/1989 | Ito et al. | 433/26 |
| D319,404 S | * | 8/1991 | Jackson, Sr. | D10/64 |
| 5,251,642 A | * | 10/1993 | Handlos | 600/587 |
| D366,842 S | | 2/1996 | Parlett | D10/64 |
| 5,692,861 A | * | 12/1997 | Stottmann | 33/562 |
| 5,970,620 A | | 10/1999 | Campbell | 33/511 |
| D417,631 S | | 12/1999 | Erlandson | D10/64 |
| D418,070 S | | 12/1999 | Erlandson | D10/64 |
| 6,217,077 B1 | | 4/2001 | Priebe | 283/49 |
| 6,382,978 B1 | | 5/2002 | Leontopoulou et al. | 433/215 |
| 6,413,086 B1 | * | 7/2002 | Womack | 33/513 |
| 2003/0017441 A1 | | 1/2003 | Greco | 434/276 |
| 2003/0224318 A1 | | 12/2003 | Weinstein | 433/26 |

OTHER PUBLICATIONS http://www.npwrc.usgs.gov/resource/tools/deerteth/deerteth.htm.*
http://www.whitetails.com/age.html.*

* cited by examiner

*Primary Examiner*—G. Bradley Bennett
(74) *Attorney, Agent, or Firm*—James E. Walton

(57) ABSTRACT

A deer aging tool that comprises a set of three-dimensional simulated deer jaw templates that accurately depict the wear patterns of deer's teeth for deer ages one-and-a-half years through eight-and-a-half years is disclosed. The templates are full-scale in size and accurate in color and weight. Each template includes easy to read visual indicia that allows for quick and easy comparison of the template to the deer's actual jaw in the field.

20 Claims, 8 Drawing Sheets

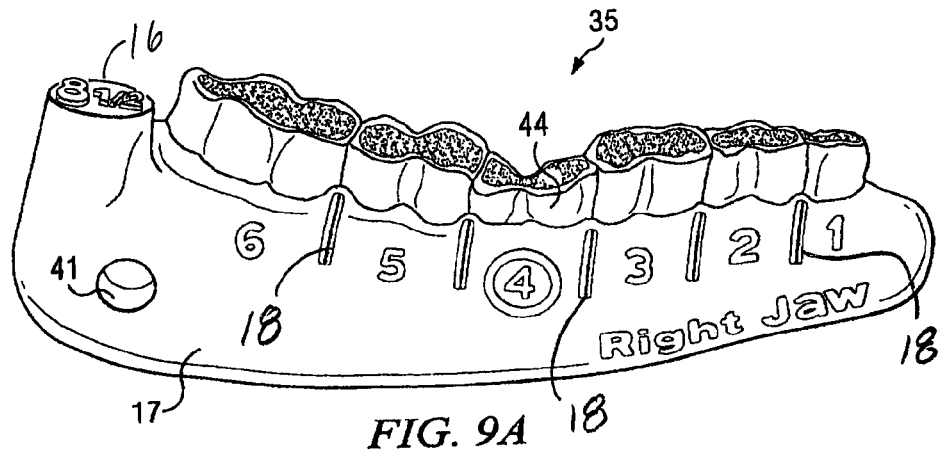
FIG. 9A
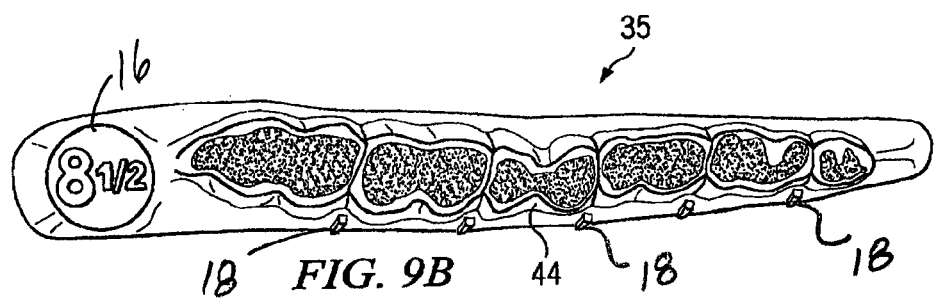
FIG. 9B
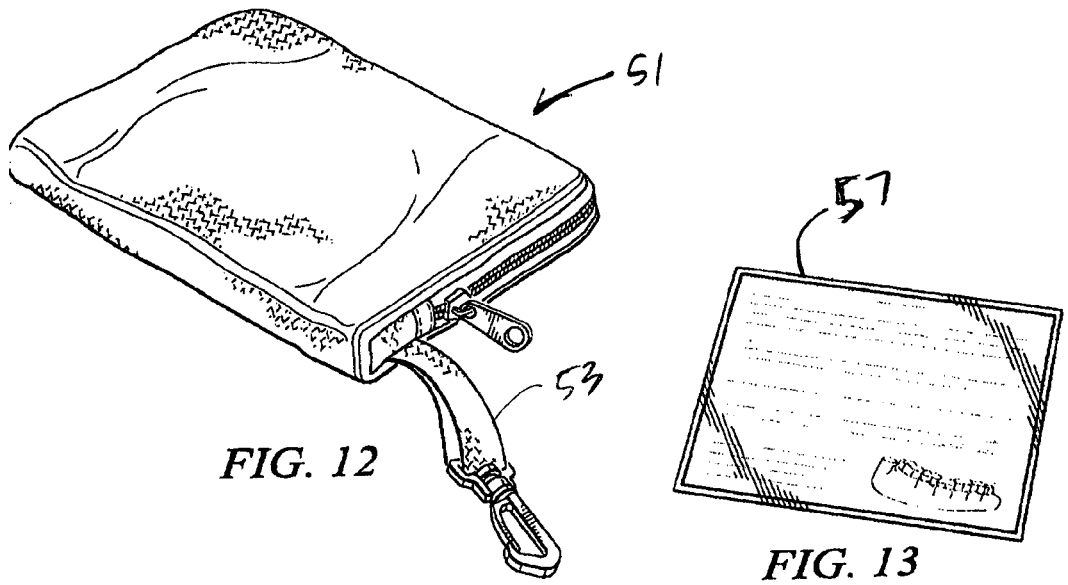
FIG. 12
FIG. 13

DEER AGING TOOL

This application claims the benefit of U.S. Provisional Patent Application No. 60/494,861 filed 13 Aug. 2003, titled "Deer Aging Tool."

BACKGROUND OF THE INVENTION

1. Field of the Invention

The present invention relates generally to wildlife age determination. In particular, to a field tool for quickly and easily determining the age of a deer.

2. Description of Related Art

Age determination of white-tailed deer is essential to any wildlife or land management program. Biologists, ranch owners, land managers, and hunters all have an interest in determining the age of deer.

It is a common misconception that for bucks, i.e., male deer, the age of the deer can be determined based upon antler size. Another common misconception is that the age of a buck can be determined by the number of "points" on the antlers. These misconceptions do not hold true because other variables, such as genetics and habitat nutrition quality, can affect the size of the deer, the size of its antlers, and the number of points on the antlers. Scientific and biological data clearly indicate that neither the size of a deer's antlers, nor the number of points on the antlers, in any way correspond to the age of the deer, and cannot be used to accurately age the deer.

On the other hand, one proven method for determining the age of a deer is based on the number and appearance of the deer's teeth. For example, a newborn fawn will only have front teeth, i.e., incisors, and no premolars or molars. As a young deer ages, it develops premolars and molars along each jaw. However, some of these premolars and molars are only temporary teeth that fall out and are replaced at a certain age. According to this deer aging method, after all of a deer's teeth have emerged, the age of the deer may be determined based upon specific wear patterns in the deer's premolars and molars. Various types and amounts of wear are prevalent at different times in the deer's life. It has been found that these wear patterns are quite consistent among deer, regardless of the different habitats and environmental conditions in which the deer live.

The only safe way of checking a deer's teeth is after the animal has been tranquilized or harvested. However, even assuming an animal's teeth can be safely inspected, only a highly trained expert such as a wildlife biologist can typically age a deer based on the appearance of teeth. It takes years of practice and a keen eye to recognize the telltale wear patterns that indicate a deer's age.

At least one field tool has been developed to assist the untrained person in determining the age of a deer. One such tool, which is shown in FIGS. 14A and 14B, is the "Pocket Deer Aging Tool" available from Wildlife Enterprises of Kerrville, Tex. This tool consists of a series of laminated cards that show two-dimensional, shaded pictures of deer teeth at various stages in a deer's life. The pictures illustrate different wear patterns, and also use shading to indicate the location and amount of dentine on the teeth of a deer at a particular age. While somewhat instructive, this deer aging tool is very difficult to use because the two-dimensional picture of a deer's teeth is limited in the amount of detail it can display. Another problem with this device is that the cards are printed on two sides, and to view the cards for successive years, the user must flip the set of cards back and forth. This makes it very difficult to compare fine distinctions between the photographs for successive years. Thus, the tool of FIGS. 14A and 14B is better suited as a reminder for biologists and other deer experts about the wear patterns of a deer's teeth.

Another product that relates to the aging characteristics of a deer's teeth is a decorative plaque that displays several simulated deer jaws, each representing a different age of a deer. Such plaques are also available from Wildlife Enterprises of Kerrville, Tex. These decorative plaques include simulated deer jaws mounted on a wooden board for display in a game room or hunting lodge. The deer's age and a short description of the wear patterns at that particular age are listed below each simulated deer jaw. One significant problem with such plaques is that they are decorative and instructional in nature and not designed or suitable for transport into the field for gauging the age of freshly harvested deer. However, the main problem with these plaques is that the wear patterns of the dentine are simply brushed onto the teeth with stain and do not form an accurate representation of the wear pattern of the teeth. Furthermore, because the simulated deer jaws are mounted to a wooden board, it is impossible to hold each jaw immediately adjacent a deer's teeth for direct comparison of the wear patterns.

Thus, the main problems presented by existing aging tools is that the tools are more educational than they are practical. While a collection of two-dimensional pictures can serve as a reminder to a trained eye, an unskilled hunter or land owner would find it difficult or impossible to determine the age of a deer by comparing the deer's teeth to two-dimensional laminated cards. With respect to the deer aging plaque, the device serves as an informative teaching tool or decorative conversation piece, but is not configured to allow close-up, in-field comparison with a deer's actual teeth.

Therefore, although the foregoing devices do represent attempts to educate the public about methods of aging deer, many shortcomings remain in the area of deer aging tools.

SUMMARY

There is a need for a deer aging tool that provides accurate deer aging results for a user with little or no wildlife training. A need further exists for a tool that can be easily transported into the field for comparison with a deer's actual teeth shortly after the deer has been tranquilized or harvested. In addition, a need exists for a tool that is inexpensive and easy to manufacture.

Therefore, it is an object of the present invention to provide a deer aging tool that provides accurate deer aging results that can be used by a user with little or no wildlife training.

It is another object of the present invention to provide a deer aging tool that can be easily transported into the field for comparison with a deer's actual teeth shortly after the deer has been tranquilized or harvested.

It is yet another object of the present invention to provide a deer aging tool that is inexpensive and easy to manufacture.

These objects are achieved by providing a deer aging tool that comprises a set of three-dimensional simulated deer jaw templates that accurately depict the tooth wear of a deer for ages one-and-a-half years through eight-and-a-half years. The templates are full-scale in size and accurate in color. Each template includes easy to read indicia that allows for quick and easy comparison of the template to the deer's actual jaw in the field.

The present invention offers several significant benefits and advantages, including: (1) the set of templates are stored on a ring member to allow quick and easy, simultaneous, side-by-side comparison of multiple templates to the deer's actual jaw; (2) each template is a full-scale, three-dimensional representation of a deer's jaw at a particular time in the deer's life; (3) each template includes an accurate color representation of the wear pattern of the dentine of each tooth in the deer's jaw; and (4) each template includes upraised indicia indicating tooth separation, tooth number, and the representative year of the jaw.

Additional objects, features, and advantages will be apparent in the written description that follows.

BRIEF DESCRIPTION OF THE DRAWINGS

FIG. 9A is a front view of jaw template of the deer aging tool of FIG. 1 representing the teeth of a deer at eight-and-a-half years of age;

FIG. 9B is a top view of the jaw template of FIG. 9A;

FIG. 12 is a perspective view of a protective pouch for carrying and storing the deer aging tool of FIG. 1;

FIG. 13 is a perspective view of a laminated instruction card that may be included with the deer aging tool of FIG. 1.

DETAILED DESCRIPTION OF THE PREFERRED EMBODIMENT

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical mechanical, structural, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
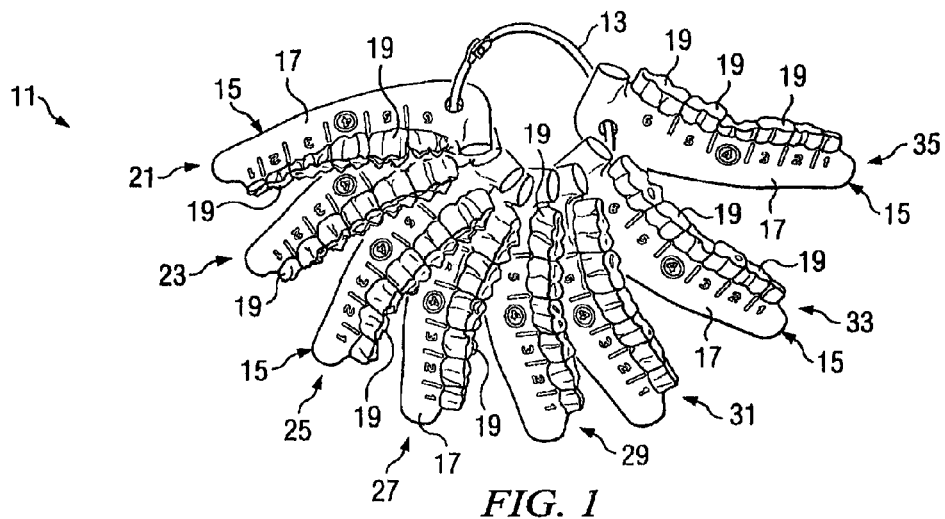
FIG. 1 is a perspective view of a deer aging tool according to the present invention.

Referring to FIG. 1 in the drawings, a deer aging tool 11 according to the present invention is illustrated. In the preferred embodiment of the present invention, tool 11 is used to age white-tailed deer. However, it will be appreciated that with minor modifications tool 11 may also be used to age other types of deer and other animals. Tool 11 includes a retaining means 13 for releasably retaining and arranging a plurality replicated three-dimensional deer jaw templates 15. Each template 15 includes a base 17 and a plurality of simulated teeth 19. A dark ink or dye, or other suitable color treatment, is used to color teeth 19 in selected areas to represent the dentine of actual deer teeth.

According to the present invention, templates 15 are created by first obtaining actual deer jaws (not shown) that have been certified by a biologist to be from a deer at a certain age. For example, one actual deer jaw would be obtained for a deer at one-and-a-half years of age, one at two-and-a-half years of age, one at three-and-a-half years of age, and so on. It is preferred that all templates 15 in a particular tool 11 be modeled after jaws from the same side and location of the deer, i.e., either all lower right jaws or all lower left jaws.

Each individual actual deer jaw is laser scanned to create a three-dimensional computer aided design (CAD) drawing. Based upon the CAD drawings, corresponding molds are made. Then, templates 15 are pour-molded using a durable, bone-colored plastic or other suitable material. By making the molds using a pour-molding process, the look, feel, and weight of the templates more accurately represents an actual deer jaw. Alternatively, the replicated deer jaws 15 could be injection-molded or cast. However, such alternative molding is not preferred due to increased cost.

Each template 15 carried by retaining means 13 differs from the other templates 15 on retaining means 13, in that each individual template 15 conveys the dental wear patterns of a deer's lower teeth at a particular selected age. The teeth 19 differ in shape, size, and wear pattern depending on the amount of wear that would be expected of a deer at a particular age. Retaining means 13 includes a one-and-a-half year template 21, a two-and-a-half year template 23, a three-and-a-half year template 25, a four-and-a-half year template 27, a five-and-a-half year template 29, a six-and-a-half year template 31, a seven-and-a-half year template 33, and an eight-and-a-half year template 35.

Although each template 15 is different from the other templates 15, it is preferred that each template 15 include certain similar visual indicia that aid the user in quickly and easily comparing templates 15 to a deer's actual teeth. For example, each template 15 includes a tab portion 16 onto which is molded in upraised characters, or otherwise indicated, the age of the deer that each template 15 represents. Also, each template 15 includes markers 18 that indicate where each tooth starts and stops along the jaw line. In addition, each template 15 includes emphasized numbers for numbering the teeth along the jaw line. Because the fourth tooth is the oldest permanent molar in the deer's jaw, the fourth tooth undergoes the most significant and visible wear. Thus, in the preferred embodiment, the fourth tooth on each template 15 includes added emphasis, or fourth-tooth-indicating means, for readily identifying the fourth tooth on each template. Each template 15 preferably includes a through-hole 41 in base 17 that allows templates 15 to be removably placed on retaining means 13 in a side-by-side arrangement according to age. It will be appreciated that through-hole 41 may be substituted with a wide variety of means for attaching template 15 to retaining means 13, such as hooks, clips, hinges, clamps and the like. This configuration allows hunters, biologists, ranchers, or other users to easily carry and store tool 11.

As is known by persons having ordinary skill in the art, the wear patterns of a deer's teeth vary depending upon age. By examining the lower premolars and molars on one side of a deer's lower jaw, the age of the deer can be determined. The following paragraphs describe the lower premolars and molars on a deer at each successive year of the deer's life. The years of the deer's life are expressed on the half-year because deer are typically born in June and harvested in the fall.

Figure 2A:
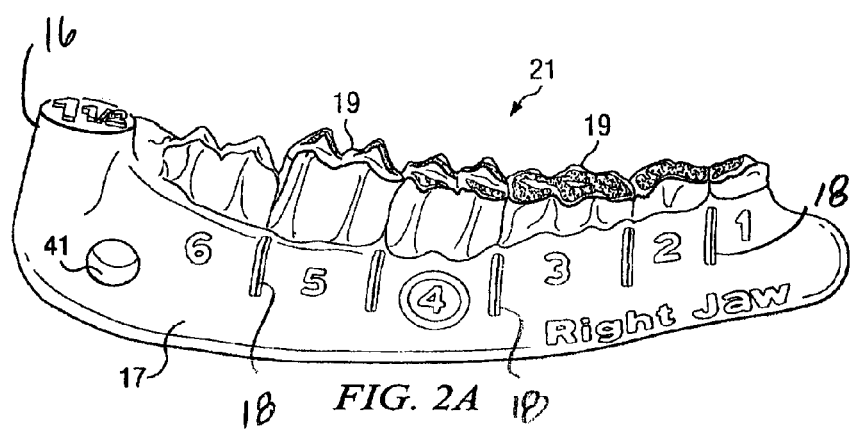
FIG. 2A is a front view of jaw template of the deer aging tool of FIG. 1 representing the teeth of a deer at one-and-a-half years of age.
Figure 2B:
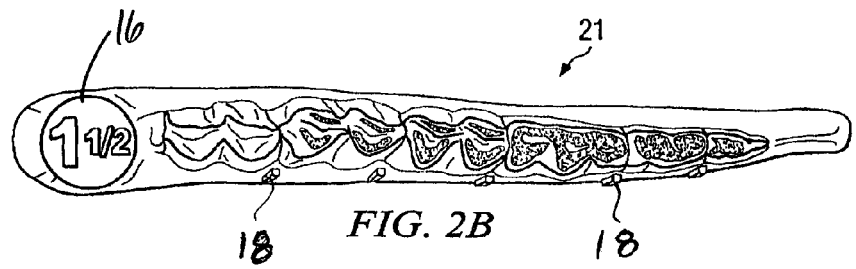
FIG. 2B is a top view of the jaw template of FIG. 2A.

Referring now to FIGS. 2A and 2B in the drawings, template 21 representing a right lower jaw of a deer one-and-a-half years old is illustrated. FIG. 2A is a front view of template 21, and FIG. 2B is a top view of template 21. At one-and-a-half years of age, the front three teeth are milk teeth, or baby teeth, which will later fall out and be replaced by permanent teeth, but which have not yet fallen out. These teeth will often appear heavily worn. The third tooth has three cusps, while the permanent tooth that will eventually replace this tooth has only two cusps. The fourth, fifth, and sixth teeth are molars and are permanent teeth. At one-and-a-half years, the sixth tooth may or may not have fully erupted through the gum line.

Figure 3A:
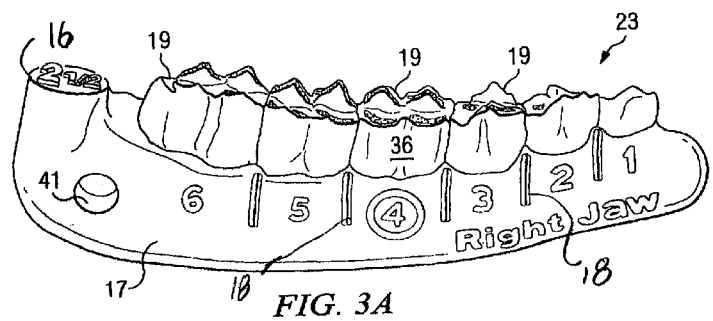
FIG. 3A is a front view of jaw template of the deer aging tool of FIG. 1 representing the teeth of a deer at two-and-a-half years of age.
Figure 3B:
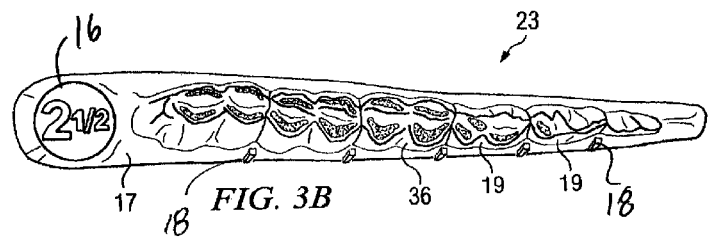
FIG. 3B is a top view of the jaw template of FIG. 3A.

Referring now to FIGS. 3A and 3B in the drawings, template 23 representing a right lower jaw of a deer two-and-a-half years old is illustrated. FIG. 3A is a front view of template 23, and FIG. 3B is a top view of template 23. At two-and-a-half years of age, the front three teeth have been replaced with permanent teeth, and the third tooth now has only two cusps. Because these front three teeth are relatively new additions, they typically show little wear. Fourth tooth 36 shows a small amount of wear, and the dentine, i.e., the dark portion, on fourth tooth 36 is not as wide as the enamel, i.e., the white portion, that surrounds it. The rear, or posterior, cusp on the sixth tooth shows some wear.

Figure 4A:
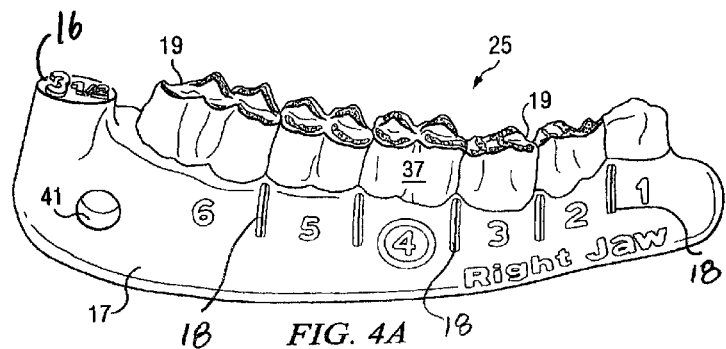
FIG. 4A is a front view of jaw template of the deer aging tool of FIG. 1 representing the teeth of a deer at three-and-a-half years of age.
Figure 4B:
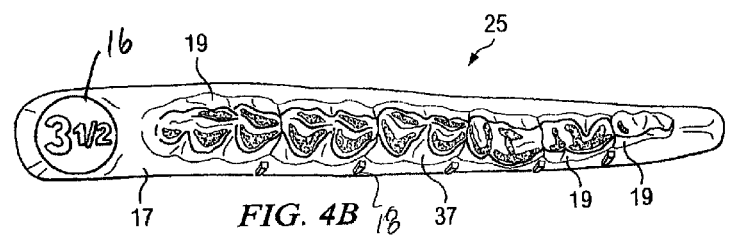
FIG. 4B is a top view of the jaw template of FIG. 4A.

Referring now to FIGS. 4A and 4B in the drawings, template 25 representing a right lower jaw of a deer three-and-a-half years old is illustrated. FIG. 4A is a front view of template 25, and FIG. 4B is a top view of template 25. At three-and-a-half years of age, the lingual crests of the molars and premolars are beginning to show some wear. The dentine on fourth tooth 37 is as wide or wider than the surrounding enamel. This is not the case with the fifth and sixth teeth. The posterior cusp of the sixth tooth now exhibits definite wear and is almost worn flat.

Figure 5A:
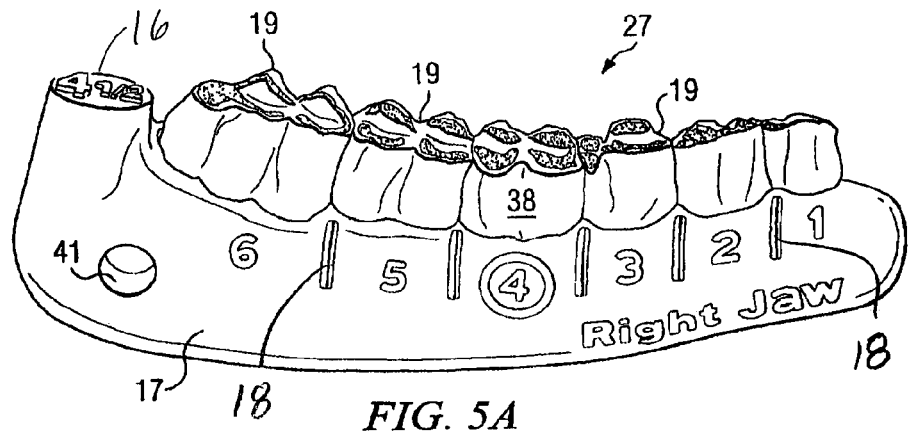
FIG. 5A is a front view of jaw template of the deer aging tool of FIG. 1 representing the teeth of a deer at four-and-a-half years of age.
Figure 5B:
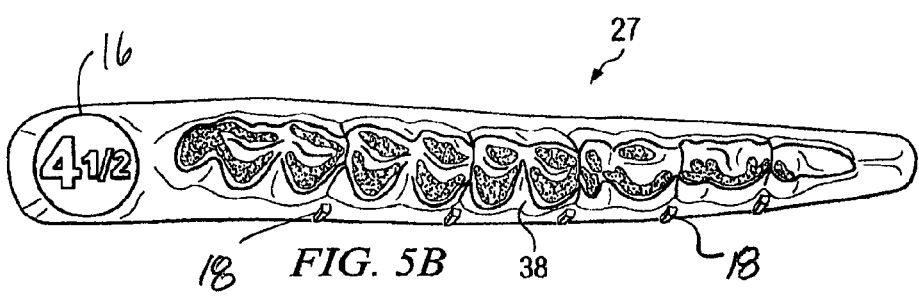
FIG. 5B is a top view of the jaw template of FIG. 5A.

Referring now to FIGS. 5A and 5B in the drawings, template 27 representing a right lower jaw of a deer four-and-a-half years old is illustrated. FIG. 5A is a front view of template 27, and FIG. 5B is a top view of template 27. At four-and-a-half years of age, the lingual crest of fourth tooth 38 is gone. The dentine on both fourth tooth 38 and the fifth tooth is as wide or wider than the surrounding enamel. This is not the case with the sixth tooth. The posterior cusp of the sixth tooth is now badly worn, and the outer edges of this cusp slope downward.

Figure 6A:
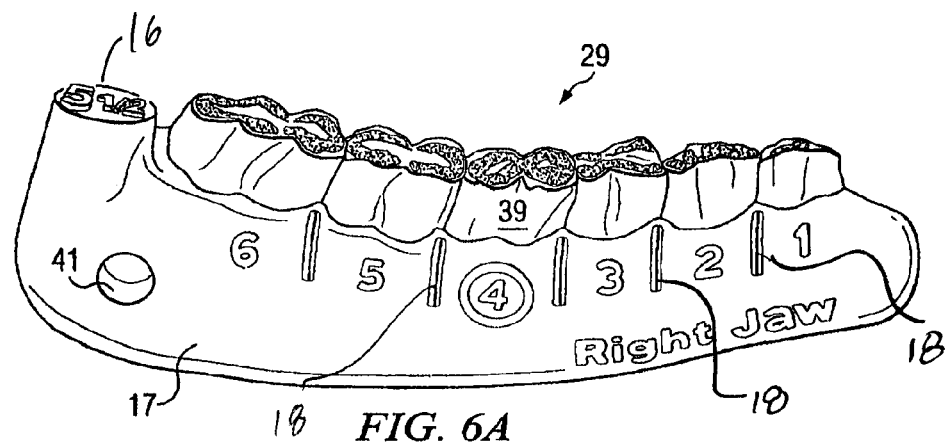
FIG. 6A is a front view of jaw template of the deer aging tool of FIG. 1 representing the teeth of a deer at five-and-a-half years of age.
Figure 6B:
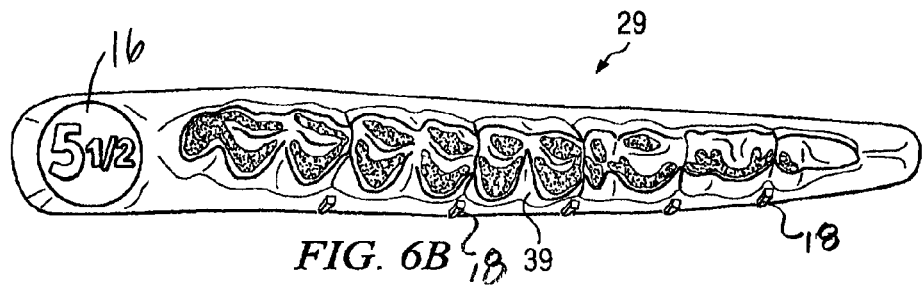
FIG. 6B is a top view of the jaw template of FIG. 6A.

Referring now to FIGS. 6A and 6B in the drawings, template 29 representing a right lower jaw of a deer five-and-a-half years old is illustrated. FIG. 6A is a front view of template 29, and FIG. 6B is a top view of template 29. At five-and-a-half years of age, the first cusp of fourth tooth 39 typically will exhibit cupping. The dentine on the fourth, fifth, and sixth teeth is as wide or wider than the surrounding enamel.

Figure 7A:
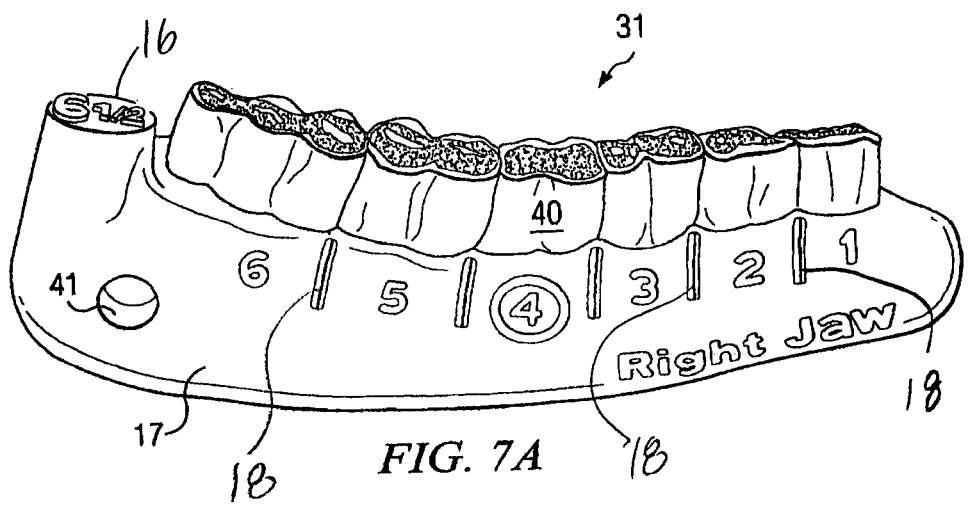
FIG. 7A is a front view of jaw template of the deer aging tool of FIG. 1 representing the teeth of a deer at six-and-half years of age.
Figure 7B:
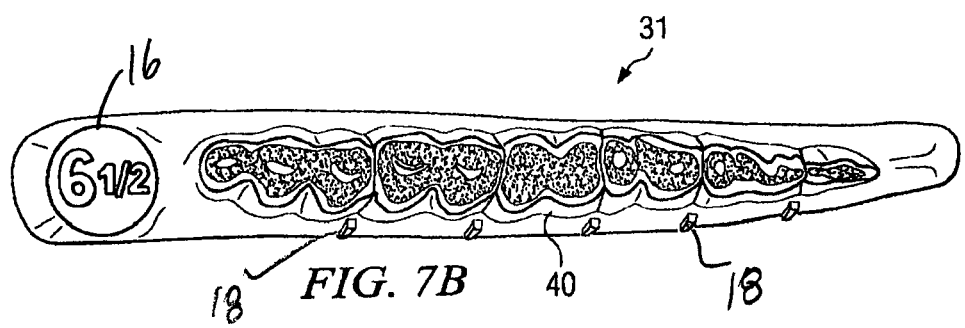
FIG. 7B is a top view of the jaw template of FIG. 7A.

Referring now to FIGS. 7A and 7B in the drawings, template 31 representing a right lower jaw of a deer six-and-a-half years old is illustrated. FIG. 7A is a front view of template 31, and FIG. 7B is a top view of template 31. At six-and-a-half years of age, fourth tooth 40 is worn smooth. The dentine on the fifth and sixth teeth is as wide or wider than the surrounding enamel.

Figure 8A:
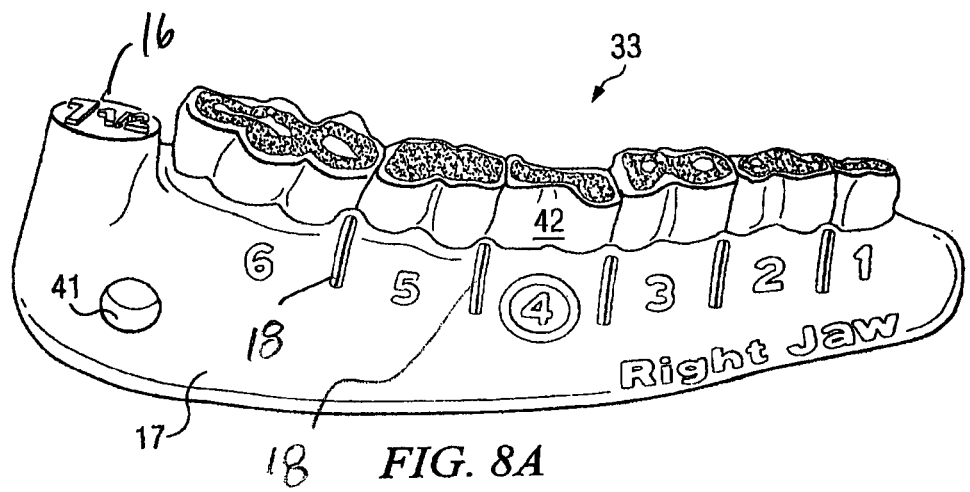
FIG. 8A is a front view of jaw template of the deer aging tool of FIG. 1 representing the teeth of a deer at seven-and-a-half years of age.
Figure 8B:
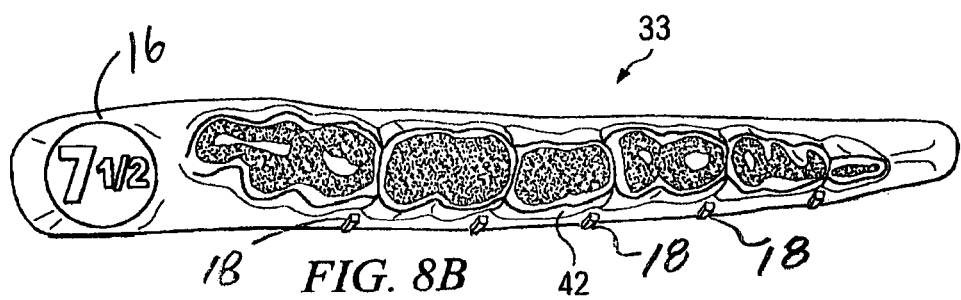
FIG. 8B is a top view of the jaw template of FIG. 8A.

Referring now to FIGS. 8A and 8B in the drawings, template 33 representing a right lower jaw of a deer seven-and-a-half years old is illustrated. FIG. 8A is a front view of template 33, and FIG. 8B is a top view of template 33. At seven-and-a-half years of age, fourth tooth 42 and fifth tooth are worn smooth.

Referring now to FIGS. 9A and 9B in the drawings, template 35 representing a right lower jaw of a deer eight-and-a-half years old is illustrated. FIG. 9A is a front view of template 35, and FIG. 9B is a top view of template 35. At eight-and-a-half years of age, fourth tooth 44 is worn smooth, as are the fifth and sixth teeth.

Figure 10:
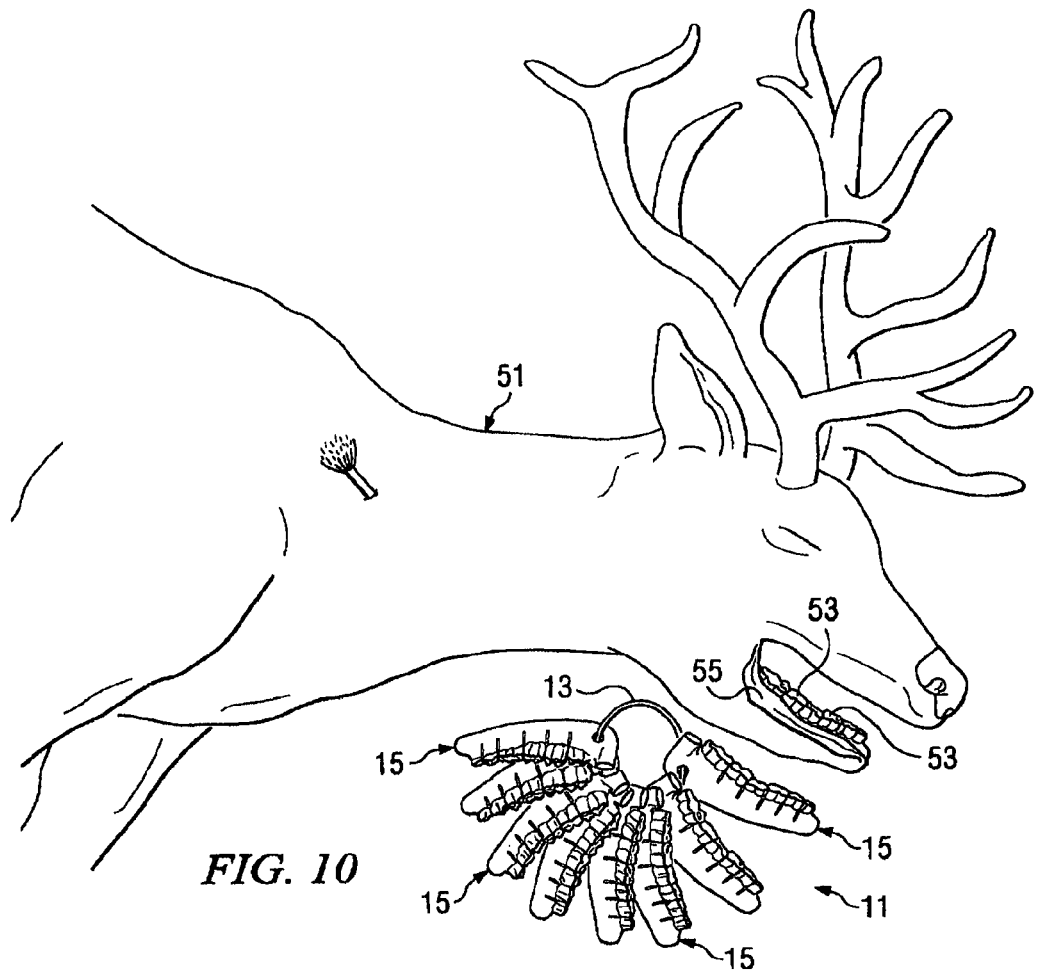
FIG. 10 is a perspective view showing the jaw of a deceased deer being compared to the jaw templates of the deer aging tool of FIG. 1.

Referring now to FIG. 10 in the drawings, the operation of tool 11 is illustrated. Tool 11 is simple and easy to use, even in the field under adverse conditions, such as in cold weather and/or low light conditions. In operation, when a deer is harvested or tranquilized, the user first exposes the appropriate teeth 53 of the deer by removing or pulling back the cheek skin and muscles 55 of the deer. For example, if tool 11 consists of templates 15 representing a deer's right lower jaw, then the right lower jaw of the actual deer should be exposed. With the appropriate teeth 53 exposed, the user then compares the actual teeth of the deer to templates 15 to determine which template 15 most closely matches the deer's actual teeth. Because templates 15 are accurate three-dimensional representations of actual deer jaws, and because templates are arranged in a side-by-side configuration according to age on retaining means 13, this comparison can be done by placing various templates 15 immediately adjacent teeth 53 and comparing templates 15 to teeth 53. This process makes it easy for the user to switch back and forth and between different templates 15 to choose the appropriate template 15. When comparing, the user should concentrate heavily on the amount of wear shown on the deer's actual teeth, and the ratio of dentine to enamel on each of the three molars. Once the appropriate template 15 is chosen, the user simply reads the textual and graphic indicia disposed on the chosen template 15 to determine the age of the harvested or tranquilized deer.

Figure 11:
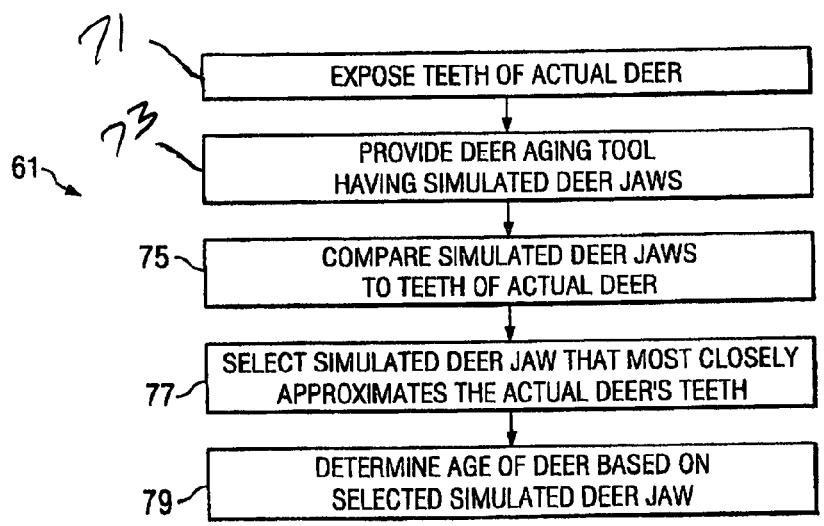
FIG. 11 illustrates a flowchart of a method of determining the age of a deer according to the present invention.
Figure 14A:
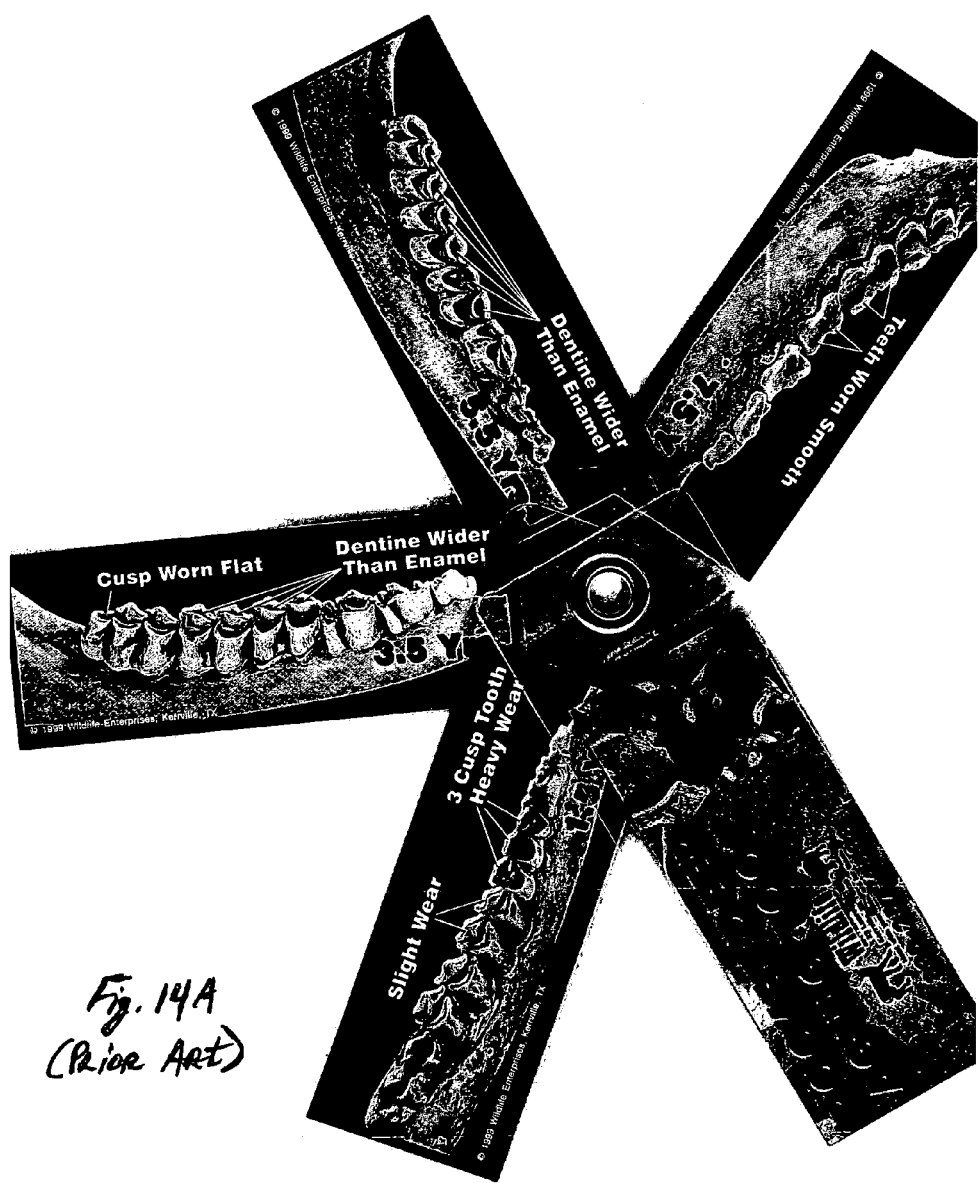
FIGS. 14A and 14B are schematics of a prior-art deer aging tool.
Figure 14B:
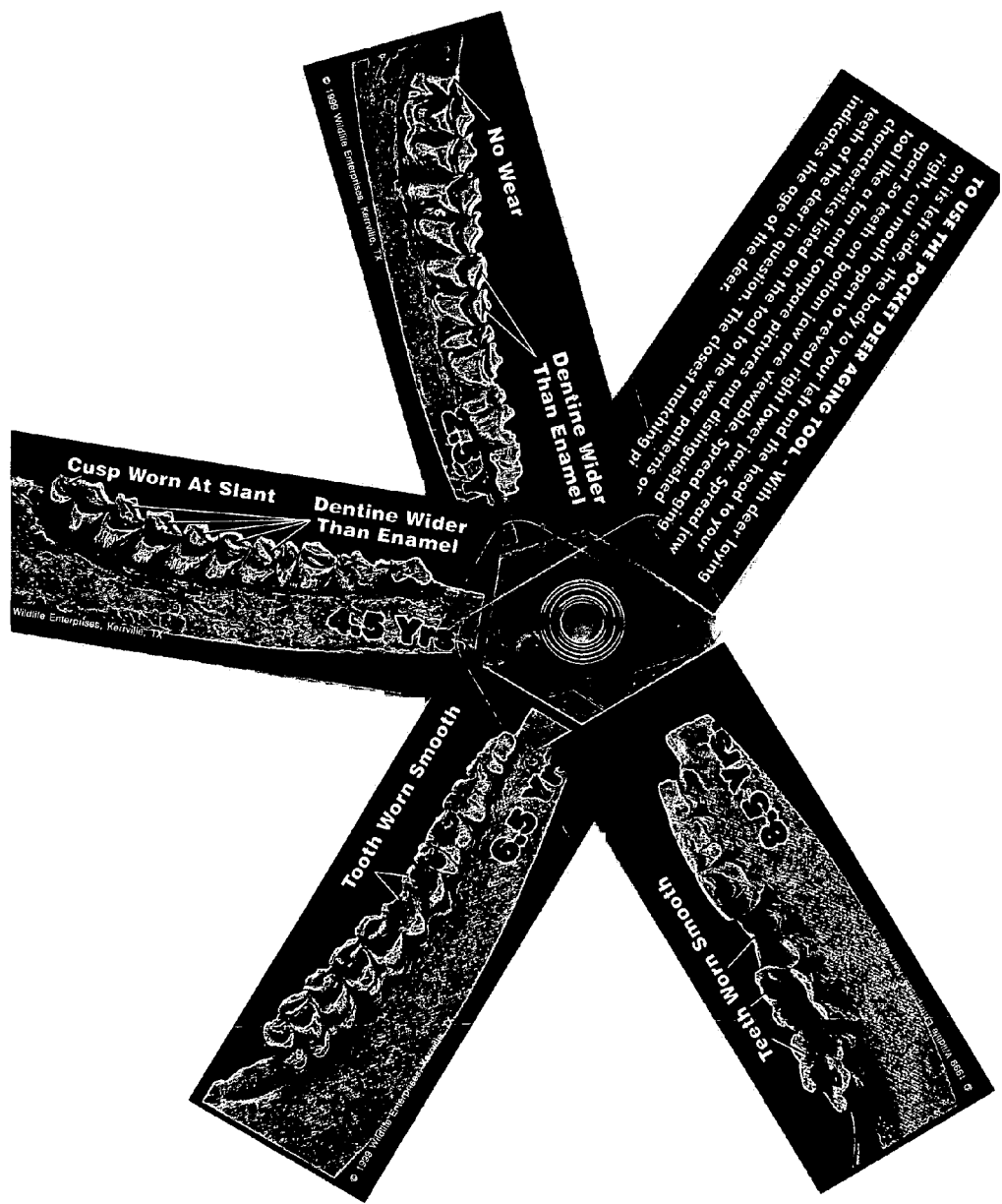

Referring now to FIG. 11 in the drawings, a chart 61 depicting the method of aging a deer according to the present invention in a step-by-step fashion is illustrated. The method of chart 61 begins with step 71 of exposing the actual teeth of a deer. Then, in step 73, tool 11 having templates 15 is provided. Next, in step 75, templates 15 are compared to the actual teeth of the deer. The method continues with step 77, in which a the template 15 that most closely represents the actual deer's teeth is chosen. Finally, in step 79, the age of the deer is determined by reading the visual indicia on the chosen template 15.

Those skilled in the art will appreciate that tool 11 could be modified to age animals other than deer, provided that these animals also exhibit characteristic and definable tooth wear patterns with age. It should be understood that templates 15 could be manufactured from any rigid material, including plastic, wood, or metal, or alternatively, could be manufactured from a silicone, nylon, or rubber formulation. In addition, although retaining means 13 has been shown in the form of a rigid hinged ring, it will be appreciated that retaining means 13 may also take the form of a straight rigid rod or a flexible cord, or could be formed in any shape from a wide variety of materials. For example, retaining means 13 may be a chain, rope, or any other suitable means for retaining, organizing, handling, and carrying templates 15.

Referring now to FIG. 12 in the drawings, a protective pouch 51 for carrying or storing tool 11 is illustrated. Pouch 51 is preferably a cushioned container that protects templates 15 from damage when not in use. Although pouch has been shown as a zipper-type pouch, it will be appreciated that pouch 51 may include preformed pockets for storing templates 15. Such preformed pockets ensure that templates 15 do not unnecessarily contact each other while stored in pouch 51. Pouch 51 may include an optional clip 53 to allow for hands-free carrying pouch 51.

Referring now to FIG. 13 in the drawings, an instruction card 57 for use with tool 11 is illustrated. Instruction card 57 is preferably laminated to protect instruction card 57 from moisture and other contaminates. Instruction card 57 preferably includes detailed information about the use of tool 11 and more detailed information about the wear patterns of deer teeth than may be practicably disposed on templates 15. Instruction card 57 may be printed on both sides, and is preferably sized and shaped for storage within pouch 51.

The combination of tool 11 with pouch 51 and/or instruction card 57 provides a deer aging kit that is accurate and easy to use in the field. With this combination even inexperienced hunters, biologists, ranchers, and others can quickly and accurately age harvested or tranquilized deer. It will be appreciated that templates 15 may by configured to represent different ages of deer. In addition, more or fewer templates 15 may be included in a kit.

It should be apparent from the foregoing that an invention having significant advantages has been provided. While the invention is shown in only a few of its forms, it is not just limited but is susceptible to various changes and modifications without departing from the spirit thereof.

I claim:

1. A deer aging tool, comprising:
    a plurality of three-dimensional templates, each template being configured in the form of a jaw and teeth of a deer at a selected age;
    a means for retaining the templates in a selected arrangement; and
    age indicia disposed on each template for indicating the selected age of the deer which the template represents.

2. The deer aging tool according to claim 1, wherein each template comprises:
    a base portion;
    a plurality of teeth carried by the base portion, each tooth being configured to indicate a selected wear pattern.

3. The deer aging tool according to claim 2, wherein the selected wear pattern is indicated by the shape of the individual teeth and patterns of color representing the dentine of the individual teeth.

4. The deer aging tool according to claim 2, further comprising:
    tooth-indicating means disposed on each template for identifying the individual teeth on each template.

5. The deer aging tool according to claim 4, further comprising:
    fourth-tooth-indicating means for identifying the fourth tooth on each template.

6. The deer aging tool according to claim 1, wherein the age indicia includes a tab portion having age-indicating characters, the tab portion being aligned in the same general direction as the teeth.

7. The deer aging tool according to claim 6, wherein the age-indicating characters are upraised numerals.

8. The deer aging tool according to claim 1, wherein each template is configured in the form of a right lower jaw and teeth of the deer.

9. The deer aging tool according to claim 1, wherein the means for retaining the templates in a selected arrangement is a rigid hinged ring.

10. The deer aging tool according to claim 1, further comprising:
    a means operably associated with each template for engaging the means for retaining the templates.

11. The deer aging tool according to claim 10, wherein the means operably associated with each template for engaging the means for retaining the templates is a through-hole.

12. The deer aging tool according to claim 1, wherein the templates are pour-molded so as to approximate the feel and weight of an actual deer jaw.

13. A three-dimensional template for aging a deer, comprising:
    a base portion for representing a lower jaw of the deer;
    a plurality of teeth members carried by the base portion, each tooth member being shaped and colored to represent a selected wear pattern;
    means disposed on the base portion for indicating a selected age of the deer;
    means disposed on the base portion for identifying the individual teeth; and
    means for retaining the template on a carrying device.

14. The three-dimensional template according to claim 12, wherein each tooth is colored with a dark pattern to indicate a dentine portion of the tooth.

15. The three-dimensional template according to claim 12, wherein the template is manufactured in a pour-molded process so as to closely simulate the look and feel of an actual deer jaw.

16. A method of aging a deer, comprising the steps of:
    providing a tool having a plurality of three-dimensional deer-jaw templates, each template representing a different selected age for a deer;
    disposing age-indicating indicia on each template;
    comparing the templates to actual teeth on an actual deer jaw;
    selecting the template that most closely corresponds to the actual deer jaw; and
    aging the deer by reading the age-indicating indicia on the selected template.

17. The method according to claim 16, wherein the each three-dimensional deer-jaw template includes a base jaw portion and upraised teeth members, in which the teeth members are configured to represent wear patterns of actual teeth on an actual deer jaw of the selected age corresponding to the age-indicating indicia for that template.

18. The method according to claim 16, further comprising the step of:
  disposing tooth-indicating indicia on each template.

19. The method according to claim 16, wherein the step of disposing age-indicating indicia on each template comprises the steps of:
  providing a tab portion that is generally aligned with the teeth; and
  disposing the age-indicating indicia on the tab portion.

20. The method according to claim 16, wherein the step of comparing the templates to actual teeth on an actual deer jaw is achieved by aligning one or more of the templates in a side-by-side arrangement with the actual teeth of the actual deer jaw.

* * * * *